W. A. OSLEY.
ANTIFRICTION DEVICE FOR VACUUM HOSE.
APPLICATION FILED SEPT. 29, 1916.

1,218,578.

Patented Mar. 6, 1917.

Inventor:
Willard A. Osley,
By Harry W. Bowen
Attorney.

UNITED STATES PATENT OFFICE.

WILLARD A. OSLEY, OF SPRINGFIELD, MASSACHUSETTS, ASSIGNOR TO VACUUM HOSE PROTECTOR COMPANY, OF SPRINGFIELD, MASSACHUSETTS, A CORPORATION OF MASSACHUSETTS.

ANTIFRICTION DEVICE FOR VACUUM-HOSE.

1,218,578.	Specification of Letters Patent.	Patented Mar. 6, 1917.

Application filed September 29, 1916. Serial No. 122,868.

*To all whom it may concern:*

Be it known that I, WILLARD A. OSLEY, a citizen of the United States of America, residing in the city of Springfield, county of Hampden, and State of Massachusetts, have invented certain new and useful Improvements in Antifriction Devices for Vacuum-Hose, of which the following is a specification.

This invention relates to improvements in devices for reducing the friction and wear of a line of hose pipe which is used in connection with vacuum cleaning apparatus. It is a well known fact in large buildings where a long line of hose is used in the vacuum cleaning operation that the wear of the hose is excessive caused by the weight of the hose on the floor, especially when the floor is made of tile or other hard surface. The effort required to move the hose from place to place in the room not only causes wear of the hose, but it is also a great effort for the operator while cleaning the room to move or pull the hose from place to place.

My invention, broadly, comprises rotatable substantially cylindrical shaped members that are loosely located and held against endwise movement on the line of hose, whereby, when a direct pull is imparted to the hose the friction is very much reduced. Also, when a transverse motion is imparted to the line of hose the devices will rotate about the axis of the hose.

A further object of my invention is to apply to the hose intermediate of the anti-friction devices a cord for protecting the hose should the same sag so as to reach the floor.

Referring to the drawings.

Figure 1:
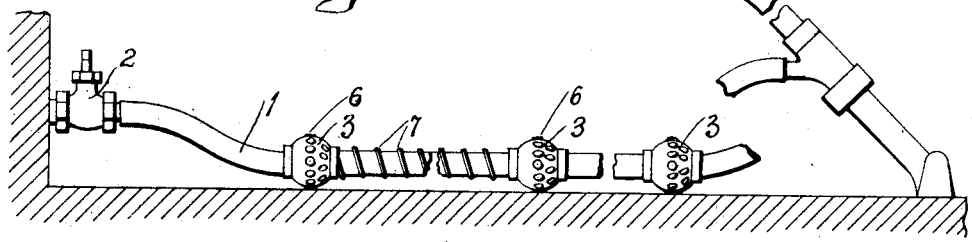
Figure 1 is a side elevational view showing a line of hose attached to a suitable nozzle and the floor tool, of conventional form, adapted for use therewith; and the anti-friction devices thereon.
Figure 2:
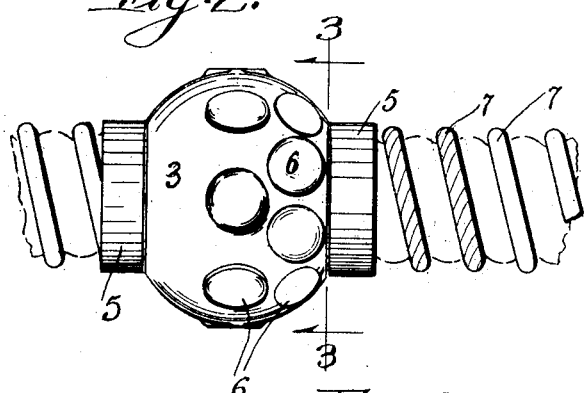
Fig. 2 is an enlarged detail view of a section of the hose showing one of the spherical devices located thereon, also showing the disk-like elements secured to the outer surface of the anti-friction devices.
Figure 3:
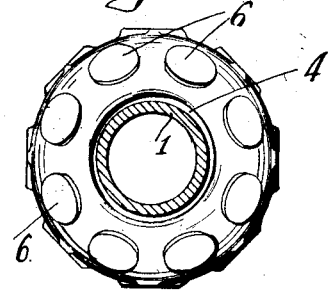
Fig. 3 is a transverse sectional view on the line 3—3 of Fig. 2 showing the hose in section and the anti-friction device in end elevation.

Referring to the drawings in detail: 1 designates a line of hose that is attached to the usual wall nozzle which in turn is suitably connected to a vacuum producing machine. 3 designates the anti-friction devices that are placed on the hose at suitable distances apart to elevate the same from the floor. These devices are formed with an opening 4 therethrough, for receiving the hose. The opposite ends of the elements 3 are formed on a plane that is at right angles to the axis. These elements are secured in place by any suitable means, as indicated at 5, which may consist of adhesive tape wound about the hose or bands of other material, as metal, whereby an annular channel is formed between the bands so that the element 3 can rotate freely on the hose about its axis when the same is moved transversely of the line of direction of the hose across the room. It will be noticed that the outer surface of the anti-friction devices 3 are formed substantially spherical or curved. Secured to the surface of these devices are metal disk-shaped elements 6, sometimes called "domes of silence", which are driven into or otherwise secured to the members 3. These anti-friction devices are placed near enough together so that the members will not bear on the floor no matter what position they may assume with reference to the hose. It is to be understood that the spherical members may be formed of wood, metal or other suitable material or may be even cast with the projections 6 thereon, the main purpose being to provide anti-friction devices of substantially the shape shown. One of the advantages of the shape of the present anti-friction device is that when the hose is drawn around a corner of a room, as a casing or leg of a table, the same will not cause the hose to bind or catch around thereon. Also, this spherical form of device readily permits the hose to be wound into a coil or about a reel. 7 designates a cord either of cotton or wire rope of suitable size that is wound around the indentations of the line of hose for the purpose of preventing the hose from coming into contact with the floor. This cord may cover the entire length of a line of hose or have a suitable length thereon and wound about the hose a suitable distance from the anti-friction devices 3.

From this construction it will be seen that I have provided an anti-friction device for protecting a line of vacuum cleaner hose against wear and also one that will permit the same to be readily moved from place to place on the floor without much effort on the part of the operator. While I have shown and described one form of my invention it is to be understood that I do not limit myself to any particular form or size of anti-friction device that is attached to a line of hose, but it is to be understood that the present invention is intended to reduce friction and at the same time permit rotary motion relative to the axis of the hose when the same is moved about the room in a transverse direction.

What I claim is:

1. In a protecting device for a vacuum cleaner hose, a substantially spherical element formed with an opening therethrough to receive the hose and of such size as to permit the device to rotate freely about the axis of the hose.

2. An anti-friction device for the purpose described, comprising a member having a curved outer surface, means for attaching the same to the hose whereby it may rotate about the hose, and means for preventing endwise movement on the hose, as described.

3. An anti-friction device for a vacuum cleaner hose, the outer surface of which is curved and provided with projections having a curved outer surface and adapted to contact with the floor, and means for rotatably retaining said device in place on the hose.

4. In a device of the class described, the combination with a line of hose, of an anti-friction device loosely mounted thereon to permit of rotation on the hose, means for retaining the same in place to prevent longitudinal movement, and means comprising a cord wound about the hose to prevent the same from coming into contact with the floor should said hose sag between the points of support of the anti-friction devices.

5. A device of the class described, comprising, in combination with a line of hose, a substantially spherical member formed with an opening therethrough, the outer forward surface of said member having projections thereon for the purpose of reducing the point of contact of said member and means for loosely and rotatably retaining said spherical member in place.

6. A protecting device for a vacuum cleaner comprising a member having an opening therethrough for receiving the hose, and means for rotatably securing the member to the hose.

7. A protecting device for a vacuum cleaner hose, comprising a substantially spherical shaped member having an opening therethrough for receiving the hose and means for rotatably securing the member to the hose.

WILLARD A. OSLEY.

Copies of this patent may be obtained for five cents each, by addressing the "Commissioner of Patents, Washington, D. C."